United States Patent [19]
English et al.

[11] Patent Number: 5,938,994
[45] Date of Patent: Aug. 17, 1999

[54] METHOD FOR MANUFACTURING OF PLASTIC WOOD-FIBER PELLETS

[75] Inventors: Brent W. English, Barneveld, Wis.;
Kevin P. Gohr, 2208 N. 23rd St., Sheboygan, Wis. 53083

[73] Assignees: Kevin P. Gohr; Willard E. Neese, both of Sheboygan, Wis.; Andrea Savanuzzi, Fontvielle, Monaco

[21] Appl. No.: 08/920,595

[22] Filed: Aug. 29, 1997

[51] Int. Cl.⁶ ........................................ B29B 9/14
[52] U.S. Cl. .................... 264/102; 264/142; 264/211.18; 264/211.23; 264/131; 427/213; 427/222
[58] Field of Search ............................... 264/102, 211.12, 264/211.13, 211.18, 211.23, 142, 131; 427/213, 222, 316, 317, 398.1

[56] References Cited

U.S. PATENT DOCUMENTS

| | | |
|---|---|---|
| 1,156,096 | 10/1915 | Price .................................... 264/211.23 |
| 3,012,900 | 12/1961 | Kleinmann et al. ..................... 427/222 |
| 3,241,246 | 3/1966 | Pollock . |
| 3,687,899 | 8/1972 | Ackermann et al. . |
| 3,791,913 | 2/1974 | ver Strate et al. ....................... 427/222 |
| 3,856,724 | 12/1974 | O'Connor et al. . |
| 3,976,608 | 8/1976 | Buckler et al. . |
| 4,115,537 | 9/1978 | Driscoll et al. . |
| 4,167,503 | 9/1979 | Cipriani . |
| 4,376,144 | 3/1983 | Goettler . |
| 4,420,351 | 12/1983 | Lussi et al. . |
| 4,454,091 | 6/1984 | Chion et al. . |
| 4,483,886 | 11/1984 | Kowalski . |
| 4,687,793 | 8/1987 | Motegi et al. . |
| 4,783,493 | 11/1988 | Motegi et al. . |
| 4,851,485 | 7/1989 | Re et al. . |
| 4,902,455 | 2/1990 | Wobbe .................................... 264/102 |
| 4,980,232 | 12/1990 | Prevorsek et al. . |
| 5,008,310 | 4/1991 | Beshay . |
| 5,075,359 | 12/1991 | Castagna et al. . |
| 5,194,461 | 3/1993 | Bergquist et al. . |
| 5,225,489 | 7/1993 | Prevorsek et al. . |
| 5,406,768 | 4/1995 | Giuseppe et al. . |
| 5,437,826 | 8/1995 | Martinello et al. . |
| 5,441,801 | 8/1995 | Deaner et al. . |
| 5,486,553 | 1/1996 | Deaner et al. . |
| 5,497,594 | 3/1996 | Giuseppe et al. . |
| 5,518,677 | 5/1996 | Deaner et al. . |
| 5,536,462 | 7/1996 | Hawrylko . |
| 5,539,027 | 7/1996 | Deaner et al. . |
| 5,574,094 | 11/1996 | Malucelli et al. . |
| 5,589,203 | 12/1996 | Sato ................................... 264/211.23 |
| 5,597,235 | 1/1997 | Barnes et al. . |

FOREIGN PATENT DOCUMENTS

0426619A2  5/1991  European Pat. Off. .

*Primary Examiner*—Jan H Silbaugh
*Assistant Examiner*—Kenneth M. Jones
*Attorney, Agent, or Firm*—Lathrop & Clark LLP

[57] ABSTRACT

A wood-plastic composite material is produced in a twin screw extruder with parallel intermeshing segmented screws. The screw segments are positioned on two spline shafts and perform the various required functions of mixing, deaerating and removal of moisture followed by extrusion. A polymer is fed to the main throat of the extruder where the plastic is conveyed along a barrel formed by the case of the extruder. Cellulosic fiber is positively fed into the extruder approximately one-quarter of the way down the extruder barrel by a twin screw side stuffer. A vent is provided for entrained air in the cellulosic material to escape. The molten mixture of polymer and cellulosic material is then conveyed to a devolatilization area having a first atmosphere devolatilization area and a second vacuum devolatilization area separated by a melt seal. A pumping section raises the pressure of the mixture of polymer and cellulosic material to between 1,000 and 6,000 psi which is then extruded through a multiplicity of small holes and separated into individual pellets by a four bladed rotating knife. Calcium carbonate, talc, or other mineral is blown onto the pellets as they are formed to prevent them from sticking to each other. The pellets are cooled to room temperature by a fluidized air bed which rapidly cools the pellets without immersing them in water.

11 Claims, 3 Drawing Sheets

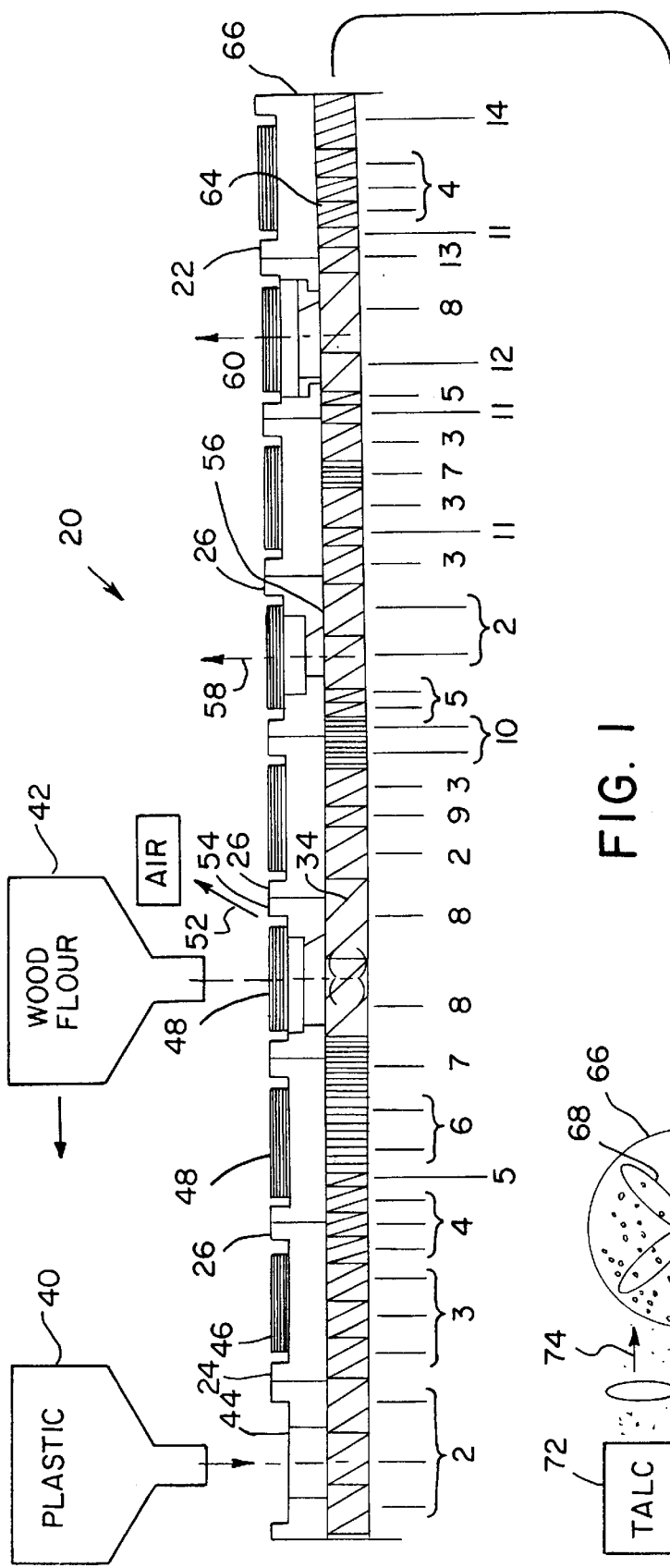
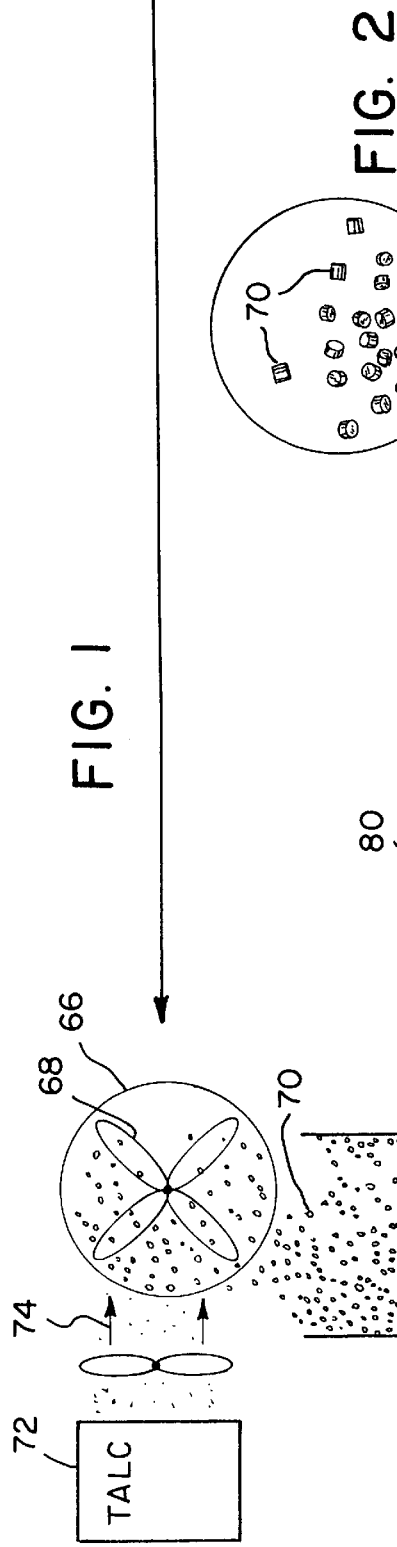
FIG. 1
FIG. 2

METHOD FOR MANUFACTURING OF PLASTIC WOOD-FIBER PELLETS

FIELD OF THE INVENTION

The present invention relates to wood filled plastic and methods for manufacturing wood filled plastic.

BACKGROUND OF THE INVENTION

Plastic can be a cost-effective material for many applications. For some applications, however, the lower cost plastics such as polyethylene, polypropylene, and polystyrene lack sufficient stiffness. Wood, on the other hand, has high stiffness. But wood of high quality, which is free of knots and has a uniform grain such that it is suitable for use in mass production products, is expensive and, in recent times, a reliable source of such wood has been difficult to find. Plastic has a lower modulus of elasticity than wood, and hence a stiffness which is less than that required for many applications. This is particularly the case for relatively low cost plastics such as polyethylene, polypropylene, and polystyrene. Wood, while having a substantially higher modulus of elasticity than common plastics, is subject to attack by insects, fungus, and mold. Furthermore, wood, because of its tendency to absorb and lose moisture and the resultant dimensional changes, is dimensionally unstable under certain conditions.

Wood fibers and more generally cellulosic materials may be obtained at low cost and are often available as a waste product or readily manufactured from a waste stream.

By combining plastic with cellulosic materials, composite materials have been developed which combine many of the advantages of wood and of plastic while avoiding the disadvantages of either material. The plastic-wood fiber compounds which are sold as a substitute for plastic have stiffness levels approaching or surpassing those of wood while being available at a cost which is comparable or less than that of plastic with similar structural properties. The composite materials are manufactured by mixing finely divided cellulosic material into molten plastic. The mixed plastic is extruded through a die to form pellets similar in shape to the plastic pellets which are sold as the basic material for manufacturing plastic articles. Although a part manufactured of a cellulosic-plastic composite will typically be designed with that material in mind, standard extrusion and injection molding techniques can be used to fabricate parts with cellulosic-plastic composites.

The addition of cellulose to plastic presents a problem if the hot material during manufacture is exposed to moisture and thus caused to absorb undesirable moisture. It is thus critical that the manufacturing process control and eliminate moisture in the final product.

What is needed is a method of manufacturing a plastic cellulosic composite which removes moisture and prevents moisture from being reabsorbed into the finished product.

SUMMARY OF THE INVENTION

The process of this invention produces a wood-plastic composite material. The process employs a twin screw extruder with parallel segmented screws. The screw segments are positioned on two spline shafts and allow the various required functions of mixing, deaerating and removal of moisture followed by extrusion. Plastic, preferably polypropylene, polyethylene, or polystyrene, is fed to the main throat of the extruder where it is conveyed along a barrel formed by the case of the extruder. The plastic is heated while passing through a high shear area and becomes molten. Cellulosic fiber is positively fed into the extruder approximately one-quarter of the way down the extruder barrel by a twin-screw side stuffer. A vent is provided for entrained air in the cellulosic material to escape. The fiber and the plastic polymer then pass through a low shear mixing area in the extruder. The temperature is controlled by limiting shear rates and by providing a water-cooled jacket to prevent degrading of the cellulosic material. The maximum temperature is limited to about 400 degrees Fahrenheit and is preferably below 390 degrees Fahrenheit.

The molten mixture of polymer and cellulosic material is then conveyed to a devolatilization area in the extruder which incorporates an atmospheric vent. The mixture is moved through the atmospheric vent by drag-flow. Use of conveyor elements which produce drag-flow keeps the mixture from migrating up the vent and allows the release of some of the moisture entrapped in the fiber. To separate the devolatilization zone from the following zone, a melt seal is formed using a small low-shear mixing element on the twin spline shafts. A second devolatilization zone is formed where additional moisture is removed. The second zone employs a vacuum of 0.6 to 0.95 bar or about 18 to 29.5 inches of mercury vacuum.

Following the second devolatilization zone is a pumping section which raises the pressure of the mixture of polymer and cellulosic material to between 1,000 and 6,000 psi. The high pressure mixture is extruded through a multiplicity of small holes and separated into individual pellets by a four-bladed rotating knife. Calcium carbonate, talc or other mineral is blown onto the pellets as they are formed to prevent them from sticking to each other. The pellets are cooled to room temperature by fluidized air beds which rapidly cool the pellets without immersing them in water.

It is an object of the present invention to provide a method of manufacturing a plastic cellulosic mixture with a very low moisture content.

It is a further object of the present invention to provide a method of combining cellulosic material in plastic which does not degrade the combined cellulosic material.

It is another object of the present invention to provide a process for the devolatilization of a molten plastic and cellulosic mixture.

It is a still further object of the present invention to provide a method of cooling plastic pellets containing wood fiber without subjecting the pellets to contact with water.

It is a yet further object of the present invention to provide a plastic-cellulosic material mixture in pellet form with a very low moisture content and a cellulosic material content of 20 to 80 percent.

Further objects, features and advantages of the invention will be apparent from the following detailed description when taken in conjunction with the accompanying drawings.

BRIEF DESCRIPTION OF THE DRAWINGS

FIG. 1 is a schematic view of a twin screw extruder and a process for combining cellulosic material with plastic.

FIG. 2 is a enlarged detail view of the product produced by the process of FIG.1.

DESCRIPTION OF THE PREFERRED EMBODIMENT

Figure 4:
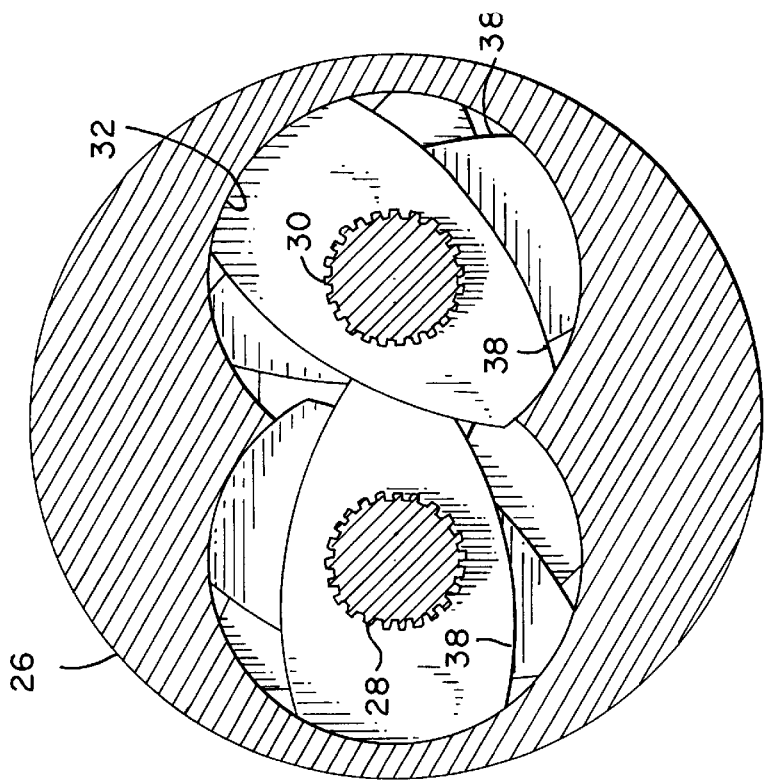
FIG. 4 is a second cross-sectional view of the twin screw extruder of FIG.1.
Figure 3:
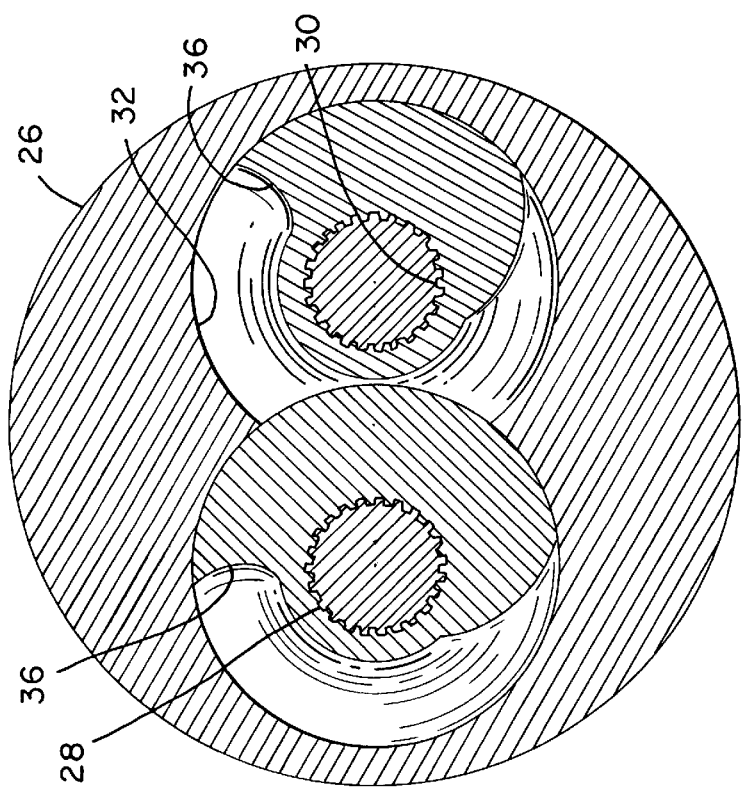
FIG. 3 is a cross-sectional view of the twin screw extruder of FIG. 1.

Referring more particularly to FIGS. 1–5 wherein like numbers refer to similar parts, a process 20 is shown in FIG. 1 for forming a cellulosic-fiber-filled thermoplastic polymer pellet. The process utilizes a twin screw extruder 22 of the type available from ICMA San Giorgio SPA, Italy. Similar extruders are described in U.S. Pat. No. 5,437,826 and European application publication No. 0 426 619 A2 the U.S. Patent being incorporated herein by reference. This type of extruder has a housing 24 which consists of barrel sectors 26 attach to each other by mechanical thread locking rings (not shown) or by a conventional system of flanges (not shown). The extruder 22 employs two spline shafts 28, 30 which extend down a figure-eight-shaped barrel 32 defined by the barrel sectors 26 as shown in FIGS. 3 and 4.

The extruder 22 is of the co-rotating type in which the spline shafts 28, 30 rotate in the same direction. Mounted on the spline shafts 28, 30 are a variety of intermeshing self-cleaning, kneading-mixing block and screw elements 34. These elements are in the shape of screws 36 as shown in FIG. 3 and kneading-mixing blocks 38 as shown in FIG. 4. By selecting the proper sequence of elements the mixing and moving of the plastic and wood flour is controlled.

The extruder has a length to diameter ratio of thirty-six to one, and a diameter of 92 millimeters. The extruder 22 consists of nine barrel sectors 26 with the nine barrel sectors 26 containing a total of forty intermeshing elements 34. The barrel sectors contain electric heating elements to supply heat to the thermoplastic polymer 40 and cellulosic material 42. Temperature is also controlled by circulating water to remove excess heat.

The process begins by the introduction of a thermoplastic polymer, preferably either polypropylene, polyethylene, or polystyrene, into the main feed throat 44 of the extruder 22. The thermoplastic polymer is heated and passed through a high shear area 46 and becomes molten. Cellulosic material is fed into the molten polymer approximately one-quarter of the way down the extruder barrel 24 at a secondary feed throat 48. The cellulosic material is fed under pressure by a twin screw side stuffer 50 into the secondary feed throat 48. A vent 52 is provided at the secondary feed throat 48 to allow air entrained in the cellulosic material to escape.

The fiber and the thermoplastic polymer then pass through a low shear mixing area 54 in the extruder 22 which follows the secondary feed throat 48. The mixing area 54 is critical. Too little mixing will not complete encapsulation of the fiber by the thermoplastic polymer. Too much mixing results in too much heat being generated from the shearing action of the mixer. If the temperature exceeds about 380 degrees Fahrenheit the cellulosic material can begin to degrade. Thus the preferred maximum temperature will be less then 400 degrees Fahrenheit preferably less that 380 degrees Fahrenheit. The amount of shear in the mixing area 54 is controlled by the choice of elements which are positioned on the spline shafts 28, 30, and by controlling the rotation of the shafts. Increased shaft speed also results in greater shear. The preferred shaft speed is between 200 and 350 rpm.

The molten mixture is then conveyed to a devolatilization area 56 which incorporates an atmospheric vent 58. The mixture of polymer and cellulosic material is moved through the devolatilization area 56 by drag-flow. The use of elements which create drag-flow conditions allows the mixture of polymer and cellulosic material to be moved through the venting area without moving up the vent 58. Further, the screw elements do not need to be full to convey the mixture of polymer and cellulosic material. The relatively high temperature of the material—approaching 380 degrees Fahrenheit—allows the release of some of the moisture entrapped in the fiber.

Further devolatilization is accomplished at a vacuum devolatilization area 60 which is located downstream of the atmospheric devolatilization area 56. More complete moisture removal from the mixture is accomplished by applying vacuum which lowers the atmospheric pressure and enhances bubble formation and migration to the mixture surface. In order to separate the vacuum devolatilization area 60 from the atmospheric devolatilization area 56 a melt seal must be formed between the two areas to prevent air from moving from the atmospheric devolatilization area 56 to the vacuum devolatilization area 60. A melt seal is created by utilizing a small low-shear mixing element 62 positioned on the spline shaft 28, 30. The low-shear mixing element must be filled with the molten mixture in order for the mixture to pass through the low-shear mixing element 62. The mixing element 62 forms the melt seal which prevents air from passing to the vacuum devolatilization area 60.

The amount of vacuum drawn on the vacuum devolatilization area 60 is about 0.8 and 0.9 bars vacuum, or about 2.9 to 1.45 psi absolute. Again, drag-flow is utilized to convey material through the vacuum vent area 60. Drag-flow is created by selecting elements that produce this type of flow. Drag-flow will prevent the mixed polymer and cellulosic material from migrating up the vacuum vent.

At the downstream end of the extruder 22 is a pumping section 64 where the devolatized polymer and fiber mixture is forced through a die plate 66 with an array of holes having a diameter of between 2–6 millimeters. The pumping section utilizes elements which increase the pressure of the mixture of polymer and cellulosic material to between 1,000 and 6,000 psi, compressing the cellulosic material to its maximum density of 1.3 to 1.5 grams per cubic cm.

Under pressure the mixture of polymer and cellulosic material is extruded through the die plate 66. A four bladed cutter 68 passes over the die plate 66 cutting the extruded molten mixture into pellets. The pellets have a diameter of between two and six millimeters dictated by the diameter of the holes in the die plate 66. Their length is controlled by the speed of the cutter 68 which will typically be set to produce pellets 70 having a length of between two and eight millimeters long.

Finely divided mineral talc 72 is introduced into a high speed air stream 74 which is directed at the surface of the die plate 66 where the pellets 70 are being produced. The mineral 72 is composed of plate-like particles which coat the still molten pellets 70 so they do not stick together. Trace amounts of talc thus become embedded in the surface of each pellet 70. The air stream begins to cool the pellets and transport them to a fluidized bed 76 cooling system. Air, indicated by arrows 78, moving up through the fluidized bed 76 cools the pellets 70.

The fluidized bed 76 operates as a continuous process with hot molten pellets 70 being continuously added to the bed and a portion of the pellets 80 circulating in the fluidized bed being removed continuously. This typically results in a small percentage of the pellets removed still being molten. However, these pellets are in contact with fully cooled pellets which rapidly solidifies them. The volume of pellets contained in the fluidized bed 76 is adjusted so that the average residence time of the pellets within the bed 76 is sufficient to cool them to the desired storage temperature.

Because of the relatively small size of the pellets within the fluidized bed the time required for cooling is relatively short. Because the inflow of pellets must equal the outflow the total weight of pellets contained in the fluidized bed and thus the size of the bed is governed by the total required residence time. If the cooling time is one-hundred seconds then the fluidized bed must be sized to accept one-hundred times the per second rate of production of the twin screw extruder 22. For the machine described and illustrated the production rate is about 800 to about 2,400 pounds per hour or about one-ninth to one-third of a pound per second. Thus the size of the fluidized bed will depend on production rate and the type of thermoplastic polymer being processed together with the cellulosic content of the material being produced. All the foregoing factors affect the total amount of heat to be removed and the rate at which heat will flow from the pellets as they are cooled.

In typical plastic extruding processes the pellets are cooled by immersing the molten pellets in water. This results in undesirable absorption of moisture by the cellulosic material. The composite mixture of thermoplastic polymer and cellulosic material is relatively resistant to absorbing moisture at room temperature however at elevated temperatures, when the material is molten, moisture is more easily absorbed. Because moisture produces undesirable degradation of the properties of the material formed it is critical to limit the moisture content of the composite material. The process 20 illustrated in FIG. 1 produces a composite material having a moisture content of less then one percent by weight. After exposure to the atmosphere at normal humidity levels the moisture content can increase to about 2 percent.

Figure 5:
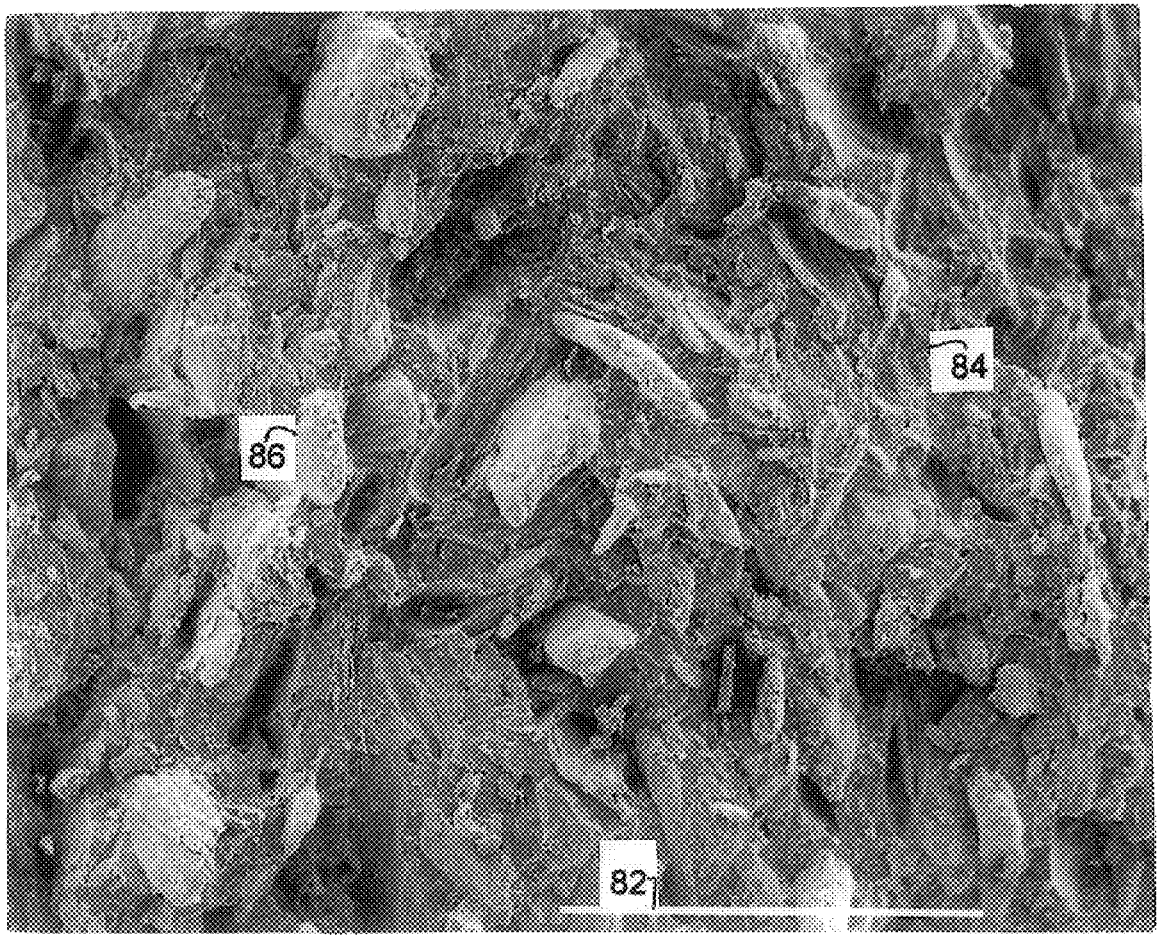
FIG. 5 is a scanning electron micrograph showing an enlarged portion of the surface of the product of FIG. 2.

FIG. 5 is a scanning electron micrograph of the broken surface of material formed in the process 20 consisting of 60 percent polypropylene and 40 percent wood flour. A size bar 82 indicates a length of one millimeter at the scale of the photo. The polypropylene matrix 84 contains and is reinforced by short aspect ratio wood fibers 86 in the form of wood flour.

The twin screw extruder 22, illustrated schematically in FIG. 1, can be obtained from a number of suppliers including ICMA San Giorgio SPA, Italy. From ICMA the individual elements which make up the intermeshing elements 34 are specified by a designation which specifies the type of element used. In the illustrated embodiment the twin screw extruder 22 consists of nine barrel sectors and forty intermeshing elements 34. These intermeshing elements 34 consist of thirteen different types of elements with the following designations arranged as follows:

three elements 2 designated 120/120
three elements 3 designated 90/90
three elements 4 designated 60/60
one element 5 designated 60/30
two element 6 designated 5-90-45°
two elements 7 designated 5-60-45° Sx
two elements 8 designated 180/180
one element 2 designated 120/120
one element 9 designated 90/45
one element 3 designated 90/90
two elements 10 designated 5-60-45°
two elements 5 designated 60/30
two elements 2 designated 120/120
one element 3 designated 90/90
one element 11 designated 90/45
one element 3 designated 90/90
one element 7 designated 5-60-45° Sx
one element 3 designated 90/90
one element 11 designated 90/45
one element 5 designated 60/30
one element 12 designated 180/90
one element 8 designated 180/180
one element 13 designated 120/60
one element 11 designated 90/45
three elements 4 designated 60/60
one element 14 designated 60/120

It should be understood that the designated intermeshing elements could be varied. And that twin screw extruders and elements from other suppliers could be used to accomplish the same steps and produce a polymer cellulosic composite with similar composition and properties.

It should be understood that the preferred cellulosic material for inclusion in the polymer are fibers which range in length from 0.01 to 0.90 millimeters and have an aspect ratio between 2.0 and 20.0. The preferred source of fiber is wood flour. The composite material created from thermoplastic polymer and cellulosic additive will have a specific gravity greater than 1.0. The composite material will have a trace amount of a mineral, typically talc, attached to the surface of the pellets. Although talc is preferred because of its relative low cost and the plate-like shape of the mineral, other minerals such as calcium carbonate could be used.

It should be understood that the moisture content of the polymer feed stock will typically be less then one percent by weight, while the moisture content of the cellulosic material will typically be between five and eight percent by weight.

It should be further noted that although the cellulosic material has been disclosed as wood flour, it may also be jute, kenaf, sisal, strong bamboo, rice hulls, corn husks, or other wood fiber, although the cellulosic material is not limited to the listed fibers.

It is understood that the invention is not limited to the particular construction and arrangement of parts herein illustrated and described, but embraces such modified forms thereof as come within the scope of the following claims.

We claim:

1. A process for producing pellets composed of plastic and cellulosic material comprising the steps of:

continuously introducing a thermoplastic polymer to a twin screw extruder and melting the polymer by heating the polymer to a temperature less than about 400 degrees Fahrenheit, while mixing the polymer and conveying the polymer in the twin screw extruder, wherein the extruder has an upstream end where the polymer is added and a downstream end where polymer is extruded, and wherein the polymer is conveyed towards the downstream end as it is melted;

continuously adding a quantity of cellulosic fiber of between about two-thirds and about five times the weight of the thermoplastic polymer to the molten polymer at a secondary feed throat between the upstream and downstream ends to form a mixture of polymer and cellulosic material;

venting air through a vent, from the twin screw extruder downstream of where the cellulosic fiber is added while conveying the mixture of polymer and cellulosic material with conveying elements which do not pressurize the polymer and cellulosic materials above atmospheric pressure;

passing the melted polymer and cellulosic material through a melt seal downstream of the vent;

applying a vacuum to a second vent in the twin screw extruder downstream of the melt seal while conveying the mixture of polymer and cellulosic material with conveying elements which do not pressurize the polymer and cellulosic materials;

raising the pressure of the polymer and cellulosic materials to between about one thousand and about six thousand pounds per square inch downstream of the second vent;

extruding the polymer and cellulosic mixture through an extrusion die;

and cutting said extruded mixture into pellets.

2. The method of claim 1 wherein the step of melting the polymer by heating includes heating to a temperature of less than about 380 degrees Fahrenheit.

3. The method of claim 1 wherein the extrusion die through which the polymer and cellulosic mixture is extruded has a multiplicity of holes having a diameter of between 2 and 6 millimeters.

4. The method of claim 1 wherein the vacuum applied to the second vent is between about 0.8 and about 0.9 bars.

5. The method of claim 1 wherein a rotating knife is used to cut the pellets to a length of between 2 and 8 millimeters.

6. The method of claim 1 wherein the twin screw extruder has two corotating screws which rotate at between 200 and 350 rpm.

7. The method of claim 1 wherein after the cellulosic material is added the mixture is passed through a mixing area in the extruder and mixed until the cellulosic fiber is completely encapsulated in the polymer, while not raising the temperature above 400 degrees Fahrenheit.

8. The method of claim 1 further comprising:

blowing a mineral powder onto the polymer and cellulosic mixture as it is being extruded and cut into pellets.

9. The method of claim 8 wherein the step of blowing mineral powder includes blowing talc powder onto the polymer and cellulosic mixture as it is being extruded and cut into pellets.

10. The method of claim 1 further comprising:

cooling the pellets in a fluidized bed.

11. The method of claim 10 wherein the twin screw extruder is operated at a selected rate of pellet production and wherein the fluidized air bed has a volume sufficient to cool the selected rate of pellet production times a selected cooling interval, pellets being continuously withdrawn from the fluidized air bed at the same rate as the selected rate of production.

* * * * *